US012595675B2

(12) United States Patent
Wiegel

(10) Patent No.: US 12,595,675 B2
(45) Date of Patent: Apr. 7, 2026

(54) INFLATABLE STABILIZED ENCLOSURE

(71) Applicant: J. Parr Wiegel, Pittsford, NY (US)

(72) Inventor: J. Parr Wiegel, Pittsford, NY (US)

( * ) Notice: Subject to any disclaimer, the term of this patent is extended or adjusted under 35 U.S.C. 154(b) by 0 days.

(21) Appl. No.: 19/185,467

(22) Filed: Apr. 22, 2025

(65) Prior Publication Data

US 2025/0376868 A1 Dec. 11, 2025

Related U.S. Application Data

(60) Provisional application No. 63/637,010, filed on Apr. 22, 2024.

(51) Int. Cl.
| | |
|---|---|
| *E04H 15/06* | (2006.01) |
| *A47C 17/80* | (2006.01) |
| *B60P 3/34* | (2006.01) |
| *B60P 3/38* | (2006.01) |
| *E04H 15/20* | (2006.01) |
| *A47C 27/08* | (2006.01) |

(52) U.S. Cl.
CPC .............. *E04H 15/20* (2013.01); *B60P 3/38* (2013.01); *E04H 15/06* (2013.01); *A47C 27/082* (2013.01); *E04H 2015/205* (2013.01); *E04H 2015/206* (2013.01); *E04H 2015/208* (2013.01)

(58) Field of Classification Search
CPC ......... A47C 27/082; B60P 3/38; E04H 15/06; E04H 15/20; E04H 2015/205; E04H 2015/206; E04H 2015/208
USPC .......................................................... 5/2.17
See application file for complete search history.

(56) References Cited

U.S. PATENT DOCUMENTS

| | | | | |
|---|---|---|---|---|
| 2,604,641 | A | * | 7/1952 | Reed ..................... A47C 27/087 5/710 |
| 3,620,235 | A | * | 11/1971 | Du Plessis ................ B60P 3/38 135/904 |
| 3,623,762 | A | * | 11/1971 | Fagan ....................... B60P 3/38 135/132 |
| 3,712,316 | A | * | 1/1973 | Leonard ................... B60P 3/38 135/132 |
| 3,772,717 | A | * | 11/1973 | Yuen ...................... A47C 27/10 5/422 |
| 4,101,062 | A | | 7/1978 | Lazar |
| 4,176,873 | A | * | 12/1979 | Barr .......................... B60P 3/38 296/210 |
| 4,371,999 | A | * | 2/1983 | Reid .................... A47C 27/087 5/711 |
| 4,867,502 | A | * | 9/1989 | Sylvester ............... B60P 3/341 296/26.11 |

(Continued)

OTHER PUBLICATIONS

Flated. (n.d.). Air-Topper. Flated. https://flated.com/collections/air-topper?srsltid=AfmBOorgH3V5u-Vh2qydhCoDcHhSRDuuVgiNSOApz_vz_fknVlzvbius (accessed Aug. 28, 2025).

*Primary Examiner* — James J Buckle, Jr.
(74) *Attorney, Agent, or Firm* — Harter Secrest & Emery LLP; Douglas R. Smith

(57) ABSTRACT
An inflatable tent assembly cooperatively engages a bed of a pickup truck and includes a plurality of pneumatically separate zones that are sequentially inflated by a pump. The inflatable tent assembly includes a main cabin having inflatable side walls. The side walls are inflatable to transition from a collapsed configuration to a rigid and self-supporting inflated configuration. The inflatable tent assembly is constructed of a drop stitch material and is free standing independent of external structural support.

26 Claims, 14 Drawing Sheets

(56)                 References Cited

U.S. PATENT DOCUMENTS

| | | | | |
|---|---|---|---|---|
| 5,011,216 A * | 4/1991 | Baughman | ............... | B60P 3/38 |
| | | | | 135/88.13 |
| 5,044,030 A * | 9/1991 | Balaton | ............... | A47C 27/081 |
| | | | | 5/687 |
| 5,421,044 A * | 6/1995 | Steensen | ............... | A47C 27/18 |
| | | | | 5/713 |
| 5,890,245 A * | 4/1999 | Klearman | .......... | A61G 7/05769 |
| | | | | 5/710 |
| 5,913,322 A * | 6/1999 | Gallant | ................... | E04H 15/42 |
| | | | | D21/834 |
| 6,708,451 B1 * | 3/2004 | Gomes | ................... | E04H 15/20 |
| | | | | 52/2.25 |
| 7,021,694 B1 * | 4/2006 | Roberts | ................... | B60P 3/341 |
| | | | | 5/118 |
| 8,550,538 B1 * | 10/2013 | Brandenburg | .......... | B60P 3/341 |
| | | | | 5/118 |
| 8,776,812 B1 * | 7/2014 | Forget | ................... | E04H 15/56 |
| | | | | 135/96 |
| 12,077,977 B2 | 9/2024 | Watts et al. | | |
| D1,085,312 S * | 7/2025 | Ding | ............................... | D25/33 |
| 2005/0097674 A1 * | 5/2005 | Mileti | ................ | A61G 7/05776 |
| | | | | 5/710 |
| 2006/0049652 A1 * | 3/2006 | Martin | .................... | E04H 15/06 |
| | | | | 296/26.08 |
| 2013/0186442 A1 * | 7/2013 | Carlson | ................... | E04H 15/06 |
| | | | | 135/88.07 |
| 2019/0017287 A1 * | 1/2019 | Currid | .................... | E04H 15/06 |
| 2020/0307118 A1 | 10/2020 | Hjerpe et al. | | |
| 2020/0307154 A1 | 10/2020 | Hjerpe et al. | | |
| 2020/0397145 A1 | 12/2020 | Hjerpe et al. | | |
| 2020/0399091 A1 | 12/2020 | Hjerpe et al. | | |
| 2021/0148135 A1 * | 5/2021 | Ward | ................... | E04H 15/006 |
| 2022/0268050 A1 * | 8/2022 | Yakubov | .............. | E04H 15/324 |
| 2023/0212872 A1 | 7/2023 | Lawson | | |
| 2024/0174162 A1 * | 5/2024 | Wolf | ....................... | E04H 15/06 |
| 2025/0067080 A1 * | 2/2025 | Kasteleiner | ............. | E04H 15/20 |
| 2025/0250814 A1 * | 8/2025 | Harmon | ................... | B60P 3/39 |

* cited by examiner

INFLATABLE STABILIZED ENCLOSURE

CROSS-REFERENCE TO RELATED APPLICATIONS

The present application claims the benefit of U.S. provisional patent application 63/637,010 filed Apr. 22, 2024, entitled INFLATABLE STABILIZED ENCLOSURE, the entire disclosure of which is hereby incorporated by reference.

BACKGROUND OF THE INVENTION

Field of the Invention

The present disclosure relates to an inflatable structure, and particularly to a camper that cooperatively engages a bed of a pickup truck, and more particularly to an inflatable camper configured to be seated within the bed of the pickup truck and that provides an enclosed water resistant shelter having a mattress, windows, and a door, and in one configuration an integrated inflatable mattress, inflatable lockable windows, and an inflatable lockable door. The inflatable structure may further be road-worthy, that is the inflatable structure may remain inflated while being secured with the truck bed even when the truck is driving at highway speeds. While disclosed as a camper for use within the bed of a pickup truck, it is further noted that the free-standing inflatable enclosure disclosed herein may be used beyond a pickup truck, such as a ground-mounted tent, ice fishing hut, hunting blind, or with a pull-behind trailer or pontoon boat, or as a tree-mounted fort or tree stand.

DESCRIPTION OF RELATED ART

In addition to transporting cargo, pickup trucks are often used for recreational activities such as camping, wherein a tent structure includes an integrated framework in conjunction with the vehicle bed to form a protected space of size suitable for temporary occupancy and shelter.

Several types of conversions are readily commercially available to pickup truck owners who desire to convert their pickup trucks to campers. A more permanent conversion is a self-contained camper unit which is mounted into the bed of the pickup truck. Usually, these camper units come completely equipped with small appliances such as a sink, a propane stove, and a refrigerator. Temporary conversions include a hard-shell camper top or a tent structure to cover the bed of the pickup truck, thereby protecting the occupants from adverse weather conditions. These temporary conversions are more desirable if the pickup truck is required for work-related or other uses.

Prior devices also include a permanent attachment of the systems to the sides of the bed of the pickup truck which creates an elevated platform. The elevated platform may incorporate a nylon tent enclosed in a permanent clam shell storage case. However, this system decreases the aero dynamics of the vehicle, and often needs a ladder for entry and exit. These systems may also significantly shift the center of weight of the pickup truck, thereby making the pickup truck less road-worthy and more prone to vehicle handling accidents.

The hard-shell camper top also has inherent disadvantages. The hard-shell camper top is heavy, and increases the task of mounting and dismounting the shell from the bed of the pickup truck. Care must be taken when mounting the hard-shell camper shell on the bed of the pickup truck, as an improperly mounted shell could detach from the pickup truck. In addition, the hard-shell camper top is bulky and, as a result, storing it presents an inconvenience problem and a storage space problem. Lastly, it is simply not very practical to remove the camper shell from the truck unless it would be near its place of storage.

BRIEF SUMMARY OF THE INVENTION

The present disclosure includes an inflatable enclosure having a plurality of pneumatic zones movable between a collapsed configuration and an inflated configuration. When the enclosure is in the inflated configuration it includes a first side wall, a second side wall, a roof, and a mattress. The first wall fluidly is connected to a first pneumatic zone, and wherein the first side wall, the second side wall, and the roof are formed of a drop stitch material. Upon inflation, the walls and roof form a solid, rigid, self-supporting structure capable of withstanding a user's weight.

In a further configuration, the present disclosure provides an inflatable tent assembly having a mattress having an inflatable first horizontal pneumatic zone and an inflatable second pneumatic zone, the second pneumatic zone overlying the first pneumatic zone and the second pneumatic zone pneumatically isolated from the first pneumatic zone; an inflatable first pillar fluidly connected to the first pneumatic zone; an inflatable second pillar fluidly connected to the second pneumatic zone; a first wall section connected to the first pillar; a roof section connected to one of the first pillar and the second pillar; a pump configured to generate a pressurized gas; and a valve fluidly intermediate (i) the pump and (ii) the first pneumatic zone and the second pneumatic zone, the valve configured to selectively expose the first pneumatic zone to the pump; wherein the first pneumatic zone, the second pneumatic zone, the first pillar, and the second pillar are movable between a collapsed configuration and an inflated configuration. In one configuration, the first pillar and the second pillar may be formed as a pillar, a post, a tube, or a panel formed of a drop stitch material. In a further configuration, all the components are inflatable and formed of the drop stitch material.

In a further configuration, an inflatable tent assembly includes a mattress having an inflatable lower pneumatic zone and an inflatable upper pneumatic zone, the upper pneumatic zone overlying the lower pneumatic zone and the upper pneumatic zone pneumatically isolated from the lower pneumatic zone; an inflatable first side wall connected to the mattress; an inflatable second side wall connected to the mattress; an inflatable first end wall connected to the inflatable first side wall; and an inflatable roof connected to one of the inflatable first side wall and the inflatable second side wall. Each of the inflatable first side wall, the inflatable second side wall, the inflatable first end wall, and the inflatable roof may be independently inflatable. The inflatable tent assembly may also include a pump configured to generate a pressurized gas and a valve fluidly intermediate the pump, and the first pneumatic zone and the second pneumatic zone. The valve may be configured to selectively expose the first pneumatic zone to the pump. The first pneumatic zone, the second pneumatic zone, the inflatable first side wall, the inflatable second side wall, the inflatable end wall, and the inflatable roof are movable between a collapsed configuration and an inflated configuration and are formed of a drop stitch material.

In a further configuration, an inflatable tent includes a first side wall having a top edge, a bottom edge, a first side edge, and a second side edge; a second side wall having a top edge, a bottom edge, a first side edge, and a second side edge; a first end wall having a top edge, a bottom edge, a first side edge, and a second side edge, the first side edge of the first end wall coupled to the first side edge of the first side wall, and the second side edge of the first end wall coupled to the first side edge of the second side wall; a roof coupled to the respective top edges of the first side wall, the second side wall, and the first end wall; and a floor coupled to the respective bottom edges of the first side wall, second side wall and first end wall. The inflatable tent is formed of a drop stitch material and includes a plurality of pneumatically isolated pneumatic zones independently movable between a collapsed configuration and an inflated configuration. Each of the first side wall, the second side wall, the first end wall, the roof, and the floor is fluidly connected to a respective independently isolated pneumatic zone of the plurality of pneumatically isolated pneumatic zones.

The present disclosure also provides that at least one of the first side wall and the second side wall, when in the inflated configuration, defines a first eave portion projecting outwardly from an adjacent lower side wall portion of the respective side wall. Still further, the other of the first side wall and the second side wall, when in the inflated configuration, may also define a second eave portion projecting outwardly from an adjacent lower side wall portion of the other respective side wall. A first step portion may also extend between the adjacent lower side wall portion of the at least one of the first side wall and the second side wall and the first eave portion, and a second step portion may extend between the adjacent lower side wall portion of the other of the at least one of the first side wall and the second side wall and the second eave portion. The first step portion and the second step portion may lie on a horizontal plane parallel to the floor and each of the first eave portion and the second eave portion may define an arcuate lateral cross section. A removable mattress may be portioned to rest on each of the first step portion and the second step portion a spaced distance above the floor. The removable mattress may include a first side edge configured to be releasably secured to first eave portion and a second side edge configured to be releasably secured to the second eave portion.

The present disclosure further provides for a first eave portion that includes a window having an insect screen occluding the window. An inflatable shutter may be configured to be removably coupled to the window to secure the window in a closed position. The inflatable shutter may be formed of a drop stitch material.

The present disclosure may further provide a valving assembly having a plurality of valves. Each respective valve of the plurality of valves is fluidly connected to a corresponding respective independently isolated pneumatic zone of the plurality of pneumatically isolated pneumatic zones. A manifold may include an inlet connected to a pump and a plurality of outlets. Each respective outlet of the plurality of outlets may be connected to a corresponding respective valve of the plurality of valves.

The present disclosure may also provide a floor that is about 4 feet wide and configured to fit between standard wheel wells within a bed of a pickup truck. The inflatable tent may also be configured to remain in the inflated configuration after deflation of any one of the first side wall, the second side wall, the first end wall, the roof, and the floor. The inflatable tent may also be configured to remain in the inflated configuration and mounted within the truck bed while the pickup truck is being operated at highway speeds, even in excess of 65 miles per hour (105 kilometers per hour).

The inflatable tent may also include a second end wall having a first side edge and a second side edge. The first side edge of the second end wall is coupled to the second side edge of the first side wall and the second side edge of the second end wall is coupled to the second side edge of the second side wall. The second end wall defines an opening therethrough for ingress into and egress from an open interior defined by the inflatable tent when the tent is in the inflated configuration. The inflatable tent may further include an inflatable door pivotally connected to the second end wall to selectively open and close the opening. The inflatable door may be formed of a drop stitch material. Additionally, the first side wall, the second side wall and the first end wall may include a plurality of fasteners configured to secure the inflatable tent to a surface.

The present disclosure further provides for an inflatable tent that includes an overhang cabin configured to overlie a portion of a cab of a pickup truck. The overhang cabin is constructed of drop stitch material. The overhang cabin may include an arcuate forward nose portion and a roof portion which is coterminous with the roof. The roof may have a first portion extending rearwardly from the arcuate forward nose portion with the first portion of the roof disposed along a first plane having a first angle relative to the horizontal plane. A second portion of the roof may extend rearwardly from the first portion of the roof to the second side edge of the first side wall and the second side edge of the second side wall. The second portion of the roof may be disposed along a second plane having a second angle relative to the horizontal plane. The second portion of the roof may also include a trailing drip edge extending rearwardly outward from the plane defined by the second side edge of the first side wall and the second side edge of the second side wall.

The present disclosure may also provide a protective tray having a tray bottom commensurate with the floor. Tray side walls may be configured to extend upwardly along at least a portion of the first end wall and the lower side wall portions of the first and second side walls.

In another configuration, an inflatable tent assembly for a truck is provided. The truck has a cab and a bed, with the bed at least partly defined by the cab and a pair of opposing bed sidewalls. The opposing bed sidewalls have an interior surface and an exterior surface. The inflatable tent assembly includes an inflatable tent movable between a collapsed configuration and an inflated configuration. The tent, when in the inflated configuration, has a first upright side wall, a second upright side wall, a roof, and a mattress. The inflatable tent may be formed of a drop stitch material and have a plurality of pneumatically isolated pneumatic zones. At least one of the pneumatic zones in the inflated configuration defines an eave overhanging at least a portion of the exterior surface of the bed sidewall. A pump generates a pressurized gas and a manifold is connected to the pump and each of the plurality of zones. The manifold is configured to selectively expose each of the pneumatic zones to the pressurized gas.

The present disclosure further provides for an eave that includes a vent/passageway to an interior of the inflatable tent when the tent is in the inflated configuration. The eave may extend laterally outward from the exterior surface of the truck sidewalls. An inflatable door may be connected to one of the first side wall and the second side wall. The inflatable door may be formed of a drop stitch material. A valving assembly may be connected to the pump and be configured to selectively connect one of the first pneumatic zone and the second pneumatic zone with the pump.

BRIEF DESCRIPTION OF THE SEVERAL VIEWS OF THE DRAWING(S)

Figures 6, 7:
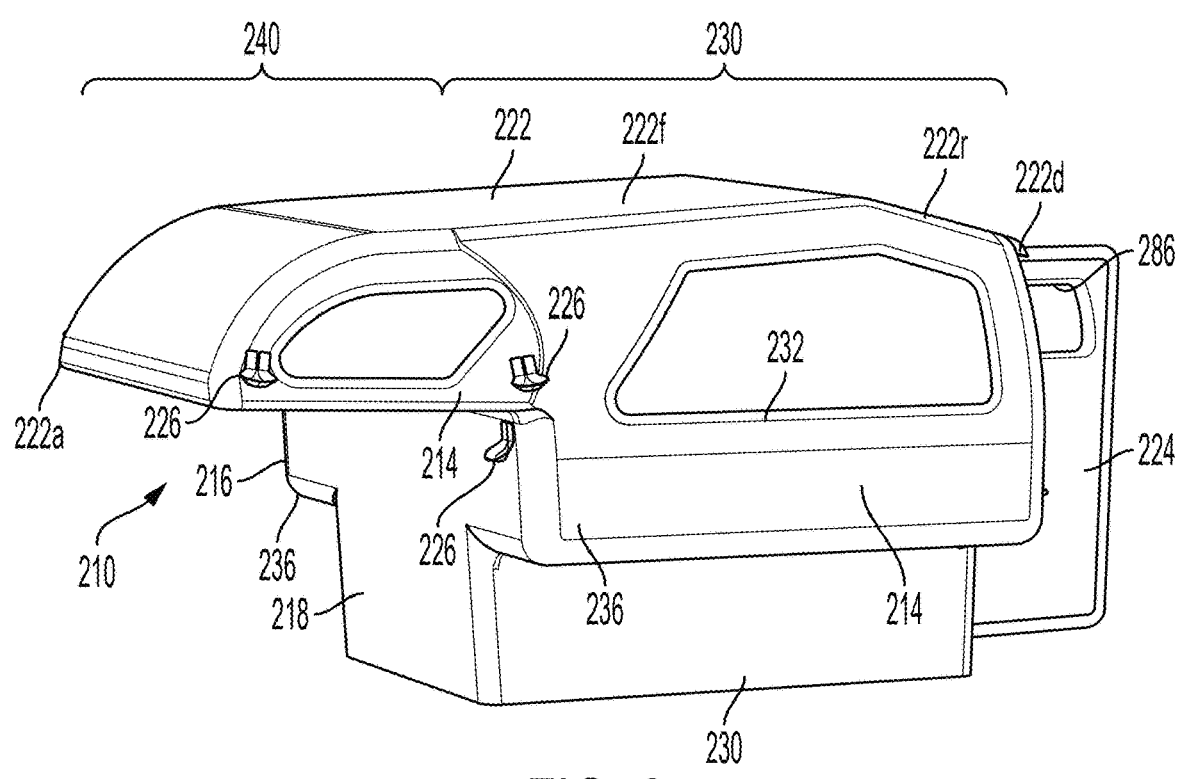
FIG. 6 is a front perspective view of another exemplary embodiment of an inflatable tent or camper in accordance with the present invention.
FIG. 7 is a rear perspective view of the exemplary embodiment of FIG. 6.
Figure 21:
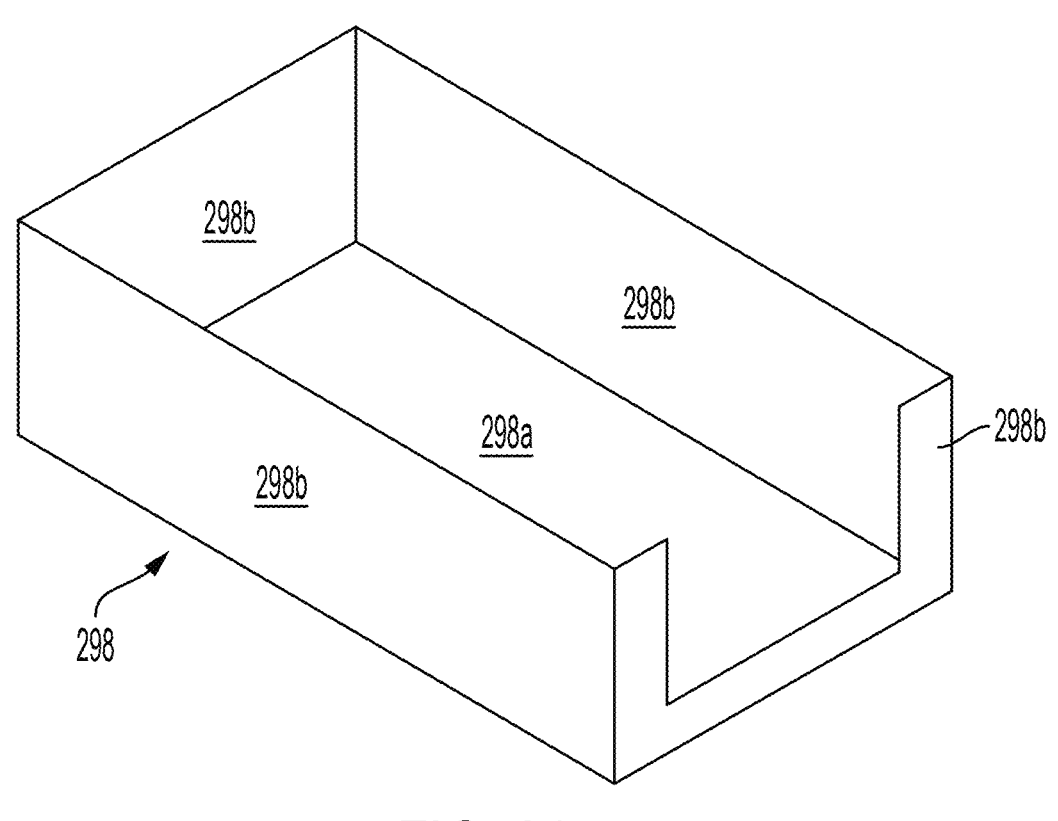

FIG. 21, a front perspective view of an exemplary embodiment of protective tray configured for use with the inflatable tent or camper of FIG. 6.

Figure 22:
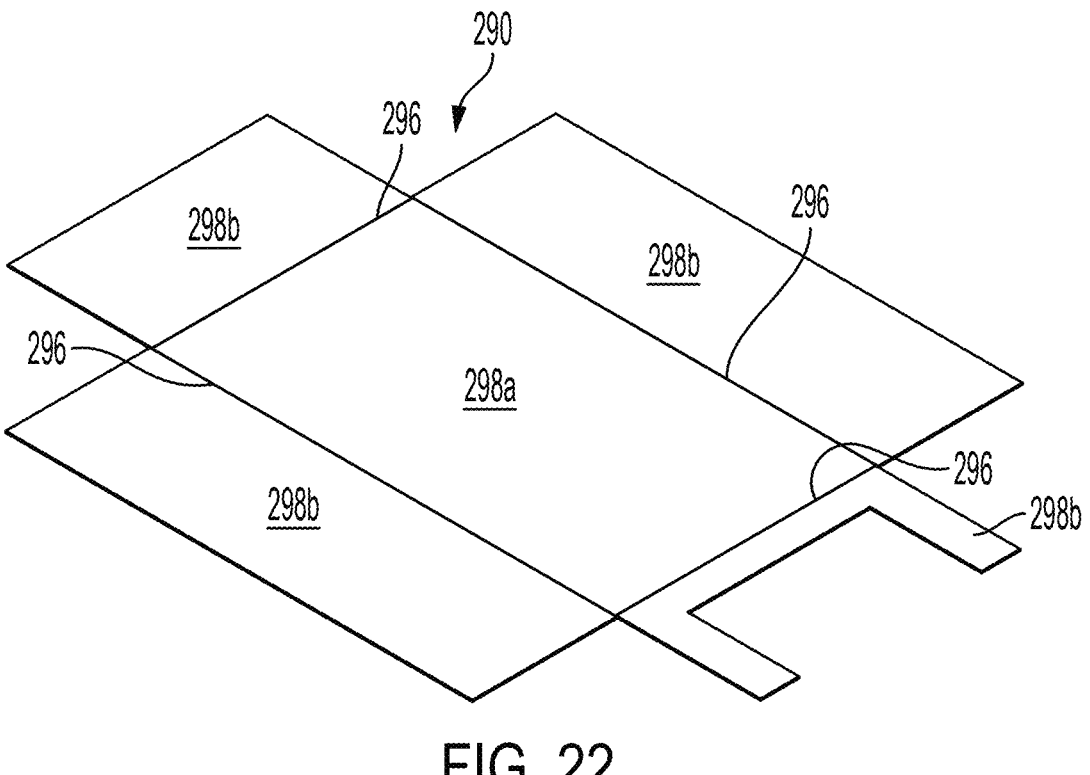

FIG. 22 is a front perspective view of the protective tray of FIG. 21 shown in an unfolded condition.

Figure 23:
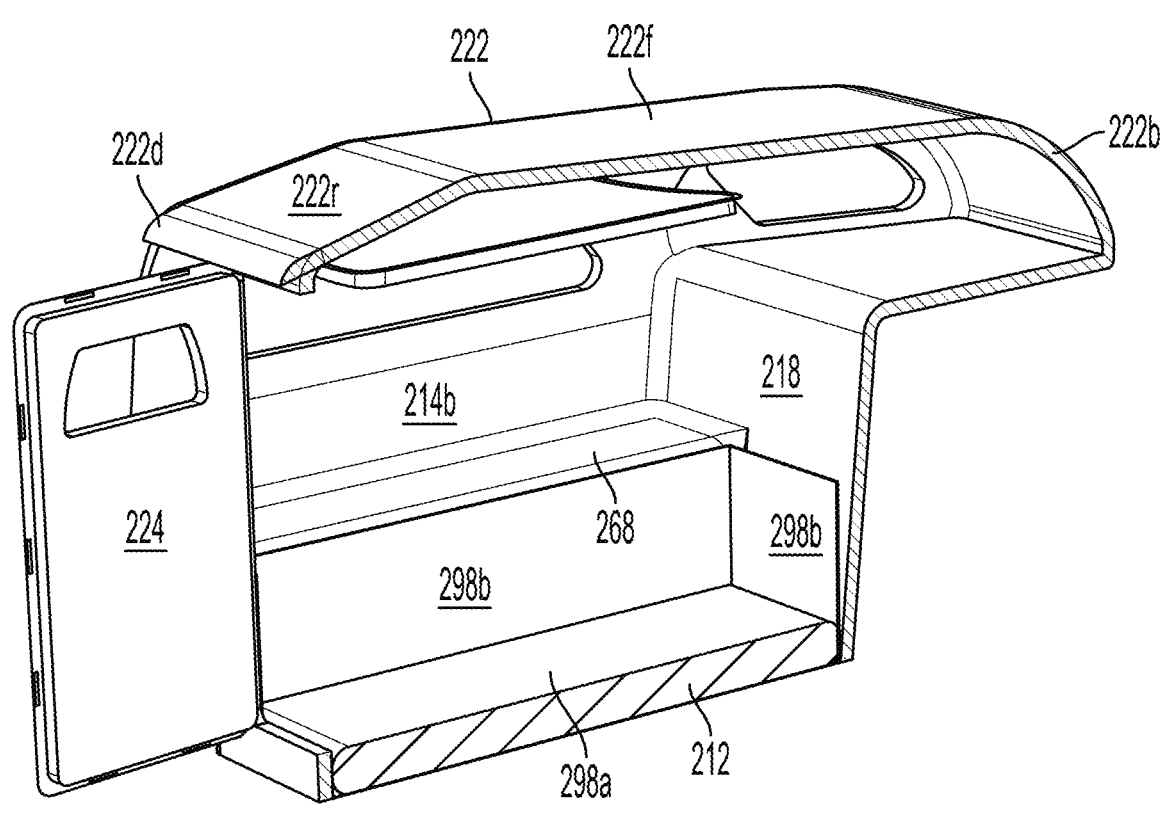

FIG. 23 is a cross-section view of the exemplary embodiment of FIG. 6 including the protective tray of FIG. 21.

Figure 24:
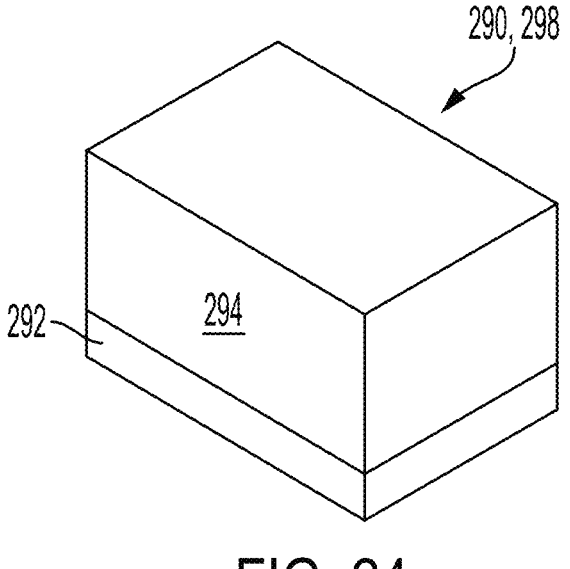

FIG. 24 is an enlarged view of a portion the protective tray of FIG. 21.

Figure 25:
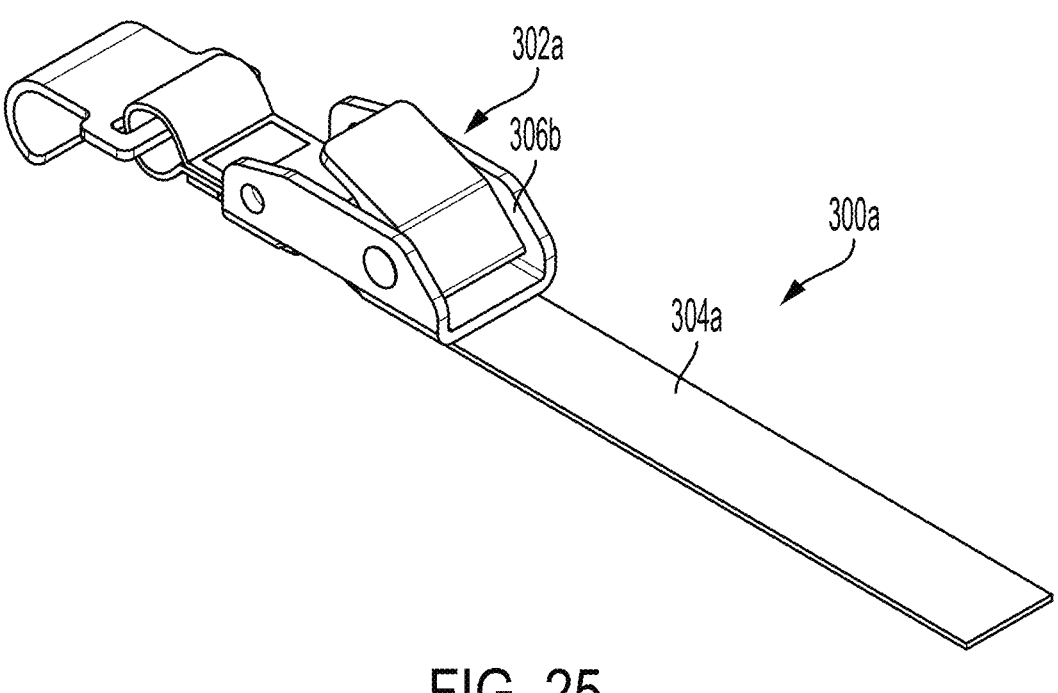

FIG. 25 is a perspective view of an exemplary tie down system for use with an inflatable tent or camper in accordance with the present invention.

Figure 26:
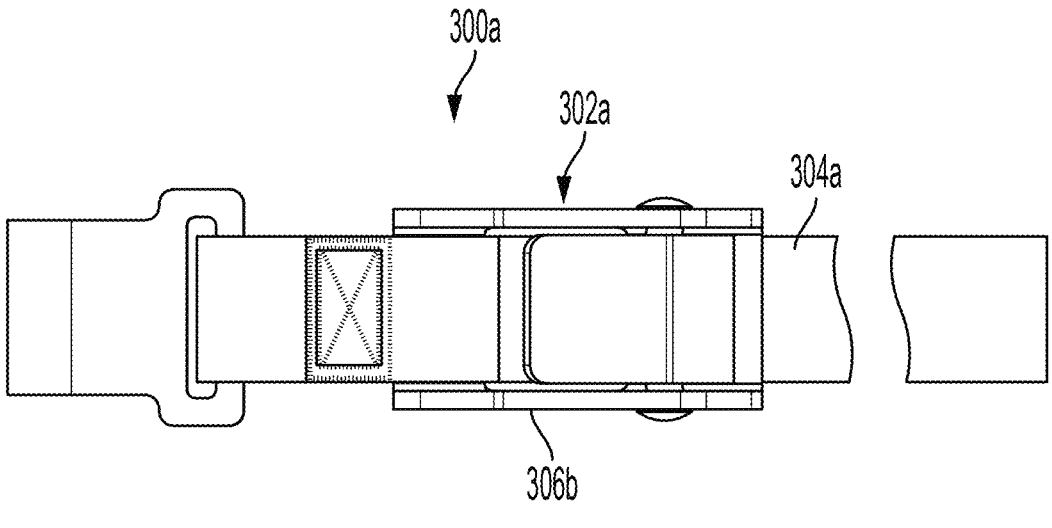

FIG. 26 is a top plan view of the of FIG. 25.

Figure 27:
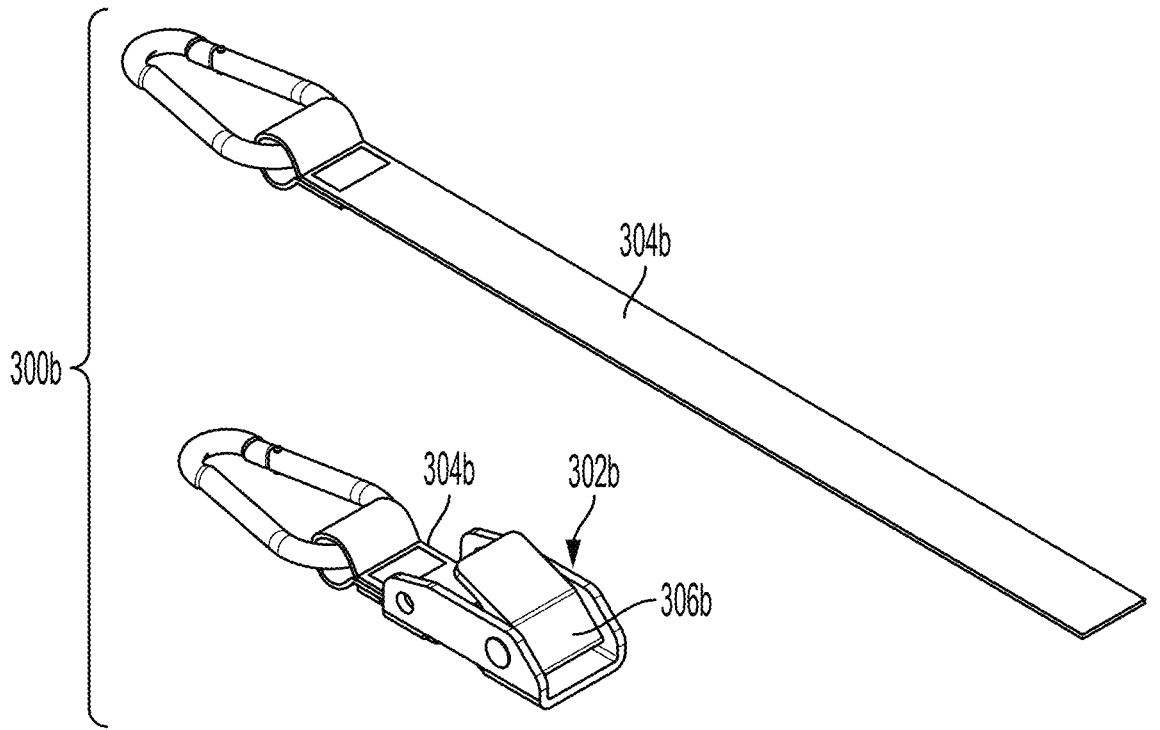

FIG. 27 is an enlarged view of another exemplary tie down system for use with an inflatable tent or camper in accordance with the present invention.

DETAILED DESCRIPTION OF THE INVENTION

Generally, with reference to FIGS. 1-5, a first exemplary embodiment of the present disclosure relates to a camper 100 for a pickup truck 102, and more particularly to an inflatable camper 100 for the bed 104 of the pickup truck 102. While disclosed as a camper for use within the bed of a pickup truck, it is further noted that the free-standing enclosure disclosed herein may be used beyond a pickup truck, such as a ground-mounted tent, ice fishing hut, hunting blind, or with a pull-behind trailer or pontoon boat, or as a tree-mounted fort or tree stand. When including four walls, a roof and a floor, all integrally coupled to form a 360-degree enclosure, the enclosure may provide an internal insulated space capable of maintaining a temperature higher than the outside environment. For instance and without limitation, the temperature inside the internal insulated space may be upwards of 30° F. to 40° F. above the external environment.

The term pickup truck is intended to encompass any of a variety of vehicles having a bed of sufficient size to retain the inflatable camper. Generally, the pickup truck 102 includes a cab 106 and a separate cargo bed 104. The enclosed cab 106 is located ahead of the bed 104 and is configured for a driver and passengers, similar to a car. The cab 106 is generally configured to provide for operation of the vehicle, similar to a passenger car. The back of the truck includes the bed 104 which provides an open cargo area.

Inflatable camper 100 includes an inflatable tent 110 movable between a collapsed configuration (not shown) and an inflated configuration, see FIGS. 1-5. As will be described in greater detail below, when the inflatable tent is in the inflated configuration, the tent includes a plurality of side walls, a roof, and a first mattress, wherein at least one of the plurality of side walls includes a door, and at least another of the plurality of walls includes a window. It is contemplated the side walls, the roof and the first mattress can be associated with a respective one of a plurality of pneumatic zones, wherein the pneumatic zones are independently inflatable. That is, the inflation status of a first pneumatic zone is independent of the inflation status of a second pneumatic zone.

In one configuration of the inflatable camper, each of the first pneumatic zone and the second pneumatic zone includes a vertical/upright/support pillars (or support tubes) configured support the associated side wall in the inflated, upright orientation. The support pillars can be formed as independent pneumatic zones from a remainder of an associated side wall. Alternatively, the support pillars, or the entire side wall can be formed of a drop stich material, wherein the drop stitch material functionally replaces the support pillars.

The inflatable drop stitch material may be a fabric, e.g., a PVC-coated and/or laminated nylon and/or polyester fabric, with layers joined by a dense array of connecting material, e.g., vertical linear and/or zigzag fibers and/or polyester strands that are uniform in size. Therefore, the inflatable drop stitch material has an outer wall, an inner wall, and connecting material between the outer wall and the inner wall. When the inflatable drop stitch material is constructed into a desired shape by chemical, mechanical, or thermal bonding, and then pressurized with air, the inflatable drop stitch material is transformed into a strong, firm structure in response to the retained air pressure. The vertical fibers and/or strands, which may be referred to as the drop stitches, hold the respective pneumatic zone firmly in shape, thus allowing the inflated structure to maintain its shape and stability during intended use.

The drop stitch material (often referred to as double wall fabric) is commercially available, such as by Trelleborg or Durainlate by Haining Duletai New Material Co., Ltd., and includes a construction having a top (or inner) fabric layer and a bottom (or outer) fabric layer woven together with a multitude of interconnecting yarns or threads. These threads create small, regularly spaced gaps or "drops" between the top and the bottom layers when the material is not inflated. When the drop stitch material is inflated, air pressure inside the chambers between the spaced layers forces the layers apart, stretching the interconnecting threads and creating a rigid structure. This allows the inflatable walls to maintain their shape and provide stability, even when subjected to pressure or weight during intended use.

The inflatable drop stitch material may be formed as described in US Patent Application Publication No. 2020/0307118, entitled "Foldable inflatable structure," in US Patent Application Publication No. 2020/0307154, entitled "Manufacturing of an Inflatable Structure," US Patent Application Publication No. 2020/0399091, entitled "Drop Stitch Tethers Alignment," and/or U.S. Patent Application Publication No. 2020/0397145, entitled "Inflatable Structure," each of which is incorporated herein by reference in its entirety.

The fabric layers of the drop stitch material can be formed of nylon, polyester, Kevlar®, as well as blends thereof. It is contemplated the drop stitch material can be coated with PVC or other waterproof material to enhance the durability and resistance to water penetration. The coatings of the fabric layers can include, but are not limited to chloro-sulfonated polyethylene (CSM), polychloroprene (CR), iso-prene, synthetic (IR).

In one configuration, at least a portion of the inflatable camper is formed of the drop-stitch material having a drop-stitch fabric layer, an airtight coating, a fusion layer and a PVC film layer in sequence from the inside to the outside. Portions or sections of the drop stitch material can be connected in an airtight manner, such as by thermal, mechanical, or chemical bonding to adjacent portions of the drop stitch material or to a separate sealing material. The PVC film layer can be configured to provide a firm, wear-resistant, waterproof, moisture-proof, and UV resistant layer. The drop stitch threads may be in a linear, zigzag or random patterns including "X" and "V" patterns. The use of drop stitch material in the inflatable side walls allows the inflatable side walls to be inflated to a pressure of 10 psi, 15 psi or greater psi, and have a thickness between 2-6 inches.

As shown in FIGS. 1-5, at least a portion of a first embodiment of an inflatable camper 110, such as one or more of the inflatable mattress 112, the inflatable side walls 114, 116, the inflatable end wall(s) 118, 120, and the inflatable roof 122 can be formed of a high-pressure drop stitch material capable of maintaining 15 psi, and up to 20 psi, and in some configurations 30 psi. Similarly, an inflat-able door can (not shown, see e.g. FIGS. 6-8) be formed of drop stitch material.

As set forth above, inflatable camper 110 includes a plurality of independently inflatable pneumatic zones, e.g. mattress 112, side walls 114, 116, end walls 118, 120, and/or roof 122. In one configuration, the inflatable camper includes at least five pneumatic zones. It is understood the inflatable camper can include any number of pneumatic zones, wherein at least two of the pneumatic zones include a support pillar and/or are formed of the drop stitch material.

The inflated support pillar and/or drop stitch sections pro-vide a vertically oriented, self-standing structural member for defining the open volume 124 of inflatable camper 110.

In one configuration, the inflatable camper includes a mattress having an inflatable first horizontal pneumatic zone and an inflatable second pneumatic zone. The second pneu-matic zone overlays the first pneumatic zone and the second pneumatic zone is pneumatically isolated from the first pneumatic zone. An inflatable first pillar is fluidly connected to the first pneumatic zone while an inflatable second pillar is fluidly connected to the second pneumatic zone. A first wall section is connected to the first pillar and a roof section is connected to one of the first pillar and the second pillar. A pump is configured to generate a pressurized gas and a valve is fluidly located intermediate (i) the pump and (ii) the first pneumatic zone and the second pneumatic zone. The valve is configured to selectively expose the first pneumatic zone to the pump. The first pneumatic zone, the second pneumatic zone, the first pillar, and the second pillar are movable between a collapsed configuration and an inflated configuration. It is contemplated each of the pneumatic zones can be formed of the drop stitch material. It is further contemplated each of the first pillar and the second pillar can be formed of the drop stitch material.

In one configuration, mattress 112 is a separate inflatable pneumatic zone from the support pillars and/or side walls 114, 116 and/or end walls 118, 120. Mattress 112 can be connected to the pillar (if provided) and the walls 114, 116, 118, 120 by fabric seams configured to provide pivoting and/or rotation between the mattress 112 and the pillars and walls 114, 116, 118, 120. Mattress 112 can have a variety of configurations, wherein in one configuration the mattress has a thickness between 5 cm and 20 cm, with an operable thickness of approximately 15 cm. The wall sections 114, 116, 118, 120 can be configured to have a nominal wall thickness, such as between 3 cm and 13 cm, with an operable thickness of approximately 5 cm.

An outside surface 110a of inflatable camper 110 can include a plurality of anchor loops 126, wherein the anchor loops 126 are attached to camper 110 to preclude non-destructive separations. Anchor loops 126 can be configured to engage a tie down or securing system 300a, 300b (see e.g., FIGS. 25-27) for retaining the inflatable camper 110 relative to the pickup truck 102. The tie down system 300a, 300b can include a plurality of ratchet strap assemblies 302a, 302b and/or jam cleats, wherein the ratchet strap assemblies 302a, 302b include an elongate strap 304a, 304b having a high tensile strength and a ratchet assembly 306a, 306b connected to one end of the strap 304a, 304b.

Returning to FIGS. 1-5, inflatable camper 110 can include a main portion, (or main cabin) 130, substantially having the footprint of the bed 104 of the pickup truck 102. It is further noted that bed 104 may include a hinged tailgate 104' which may be in a closed (or up) position defining the cargo space and an open (or down) position as shown in FIGS. 1-5. Main cabin 130 may fit entirely within the cargo space defined by bed 104 when tailgate 104' is closed, or be proportioned to extend onto tailgate 104' when in the down position. In addition, the inflatable camper 110 can include an overhang portion (or overhang cabin) 140 generally supported by and having all or a portion of the footprint of the cab roof 108. It is contemplated that both the main cabin 130 and the overhang cabin 140 can be formed as a monolithic structure from drop stitch material.

As seen in FIGS. 1-5, the overhang cabin 140 can include at least one overhang cabin side window 142. As seen in the FIGS. 1-5, there can be an overhang cabin side window 142 on each side of the overhang cabin 140. In one configuration, the overhang cabin side window 142 is a clear or at least partly transparent member that is fixedly (and water resistantly) connected to the surrounding portion of the inflatable camper 110.

Figure 8:
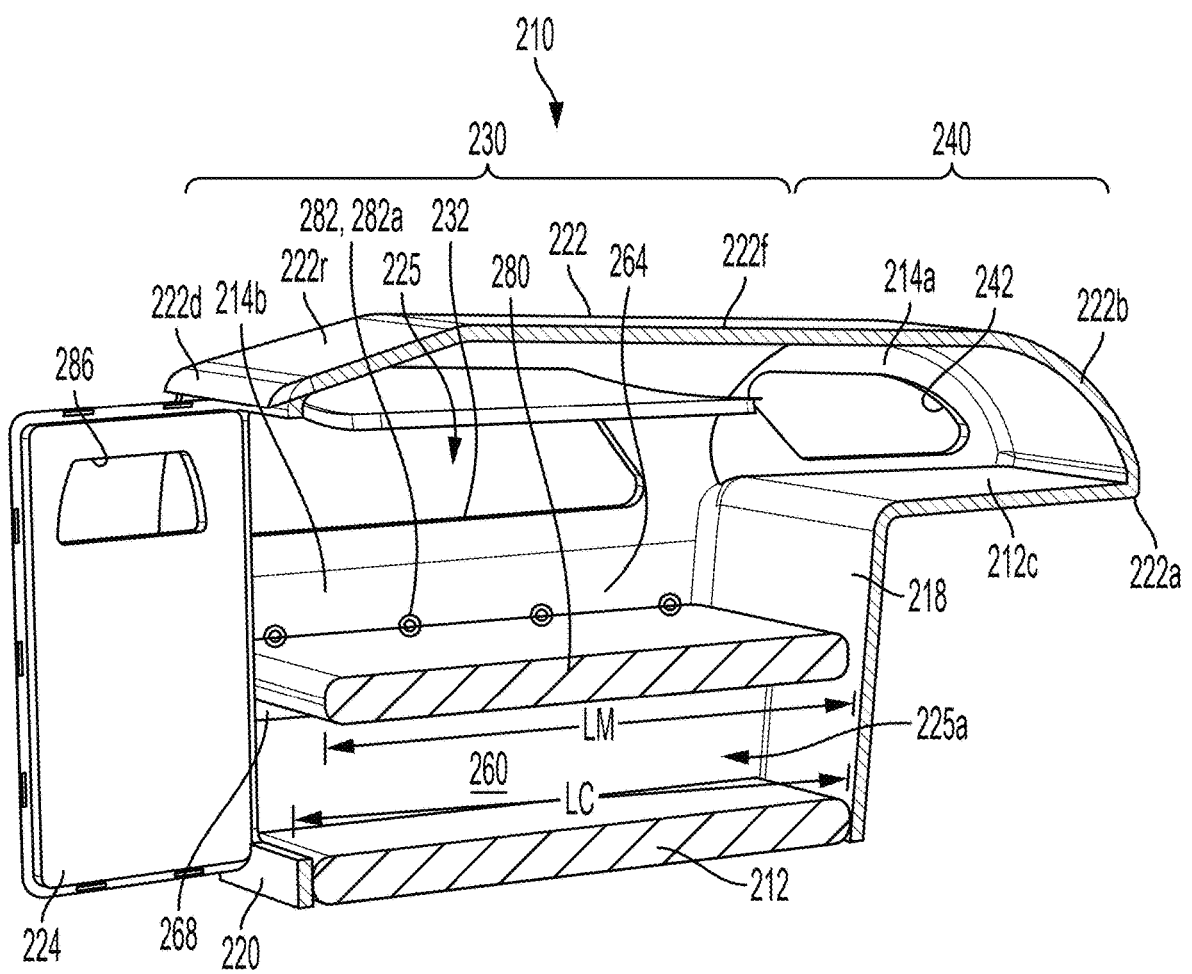
FIG. 8 is a cross-section view of the exemplary embodiment of FIG. 6.
Figure 9:
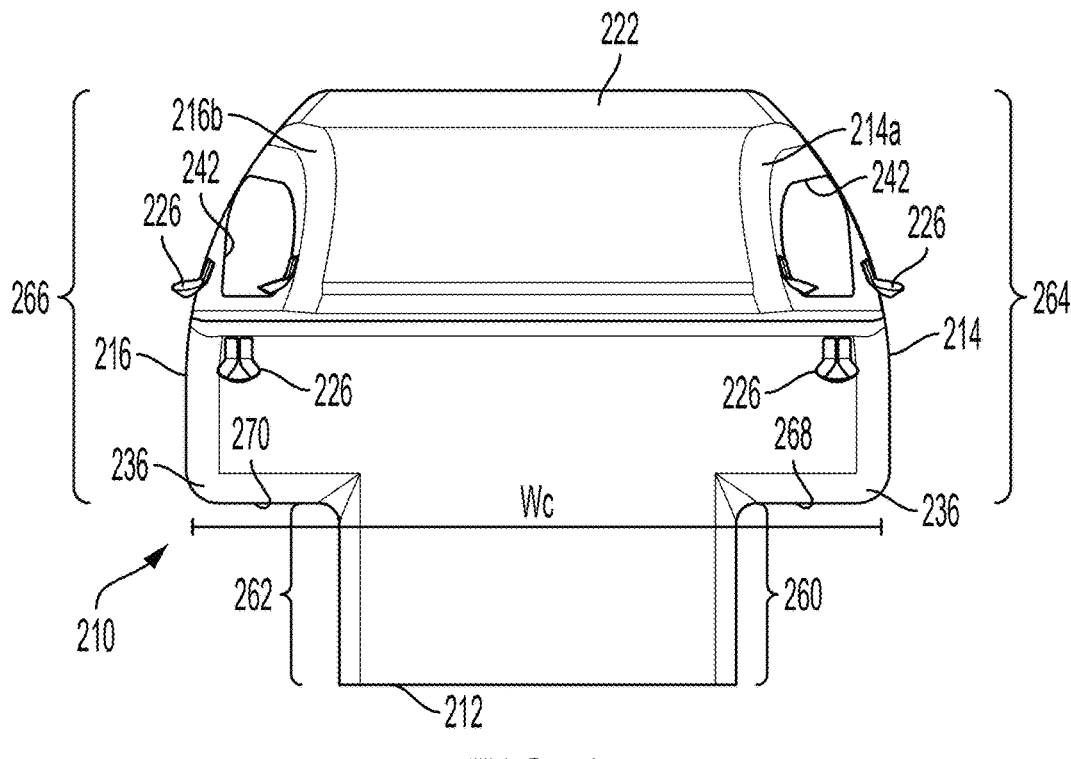
FIG. 9 is a front plan view of the exemplary embodiment of FIG. 6.

The main cabin (or main portion) 130 of the inflatable camper 110 includes main cabin side windows 132, wherein the main cabin side windows 132 can include an insect screen as an outer layer and a window shutter as an inner layer (not shown, see e.g., FIG. 8). As will be described in greater detail below with regard to FIG. 8, the window shutter is connected to the main cabin by a hinge, wherein the hinge can be located along an upper edge of the window shutter so that the window shutter can be pivoted/rotated from a closed position occluding the side window to a retracted or storage position. The window shutter is configured to preclude the passage of water and releasably engages the adjacent portion of the main cabin to preclude water migration into open volume/camper interior 124 from outside the main cabin 130. The window shutter can also be formed of drop stitch material.

Referring to FIGS. 1-5, the open interior 124 of the main cabin 130 also includes wheel well covers 134, particularly for those inflatable campers 110 configured to accommodate pickup truck beds 104 having wheel wells 104a, 104b projecting into the bed 104 or occupying a portion of the bed 104. In one configuration, the wheel well area 134 of the inflatable camper 110 is not inflatable, but formed of a flexible, waterproof fabric sized to accommodate the wheel wells 104a, 104b of the pickup truck bed 104. Mattress 112 may also define well indents 112a, 112b configured to accommodate wheel wells 104a, 104b so that mattress 112 may lay flat upon bed 104.

In one configuration, the inflatable camper employs inflatable support pillars or tubes (which, when inflated, are weight bearing members), wherein the support tubes are in separate pneumatic zones. One of the support tubes is selectively inflatable from at least one other support tube. In one configuration, the support tubes are separate pneumatic zones, wherein the pneumatic zone are independent. That is, one pneumatic zone can be fully inflated (or suffer a puncture) independent of the inflation state of the second pneumatic zone. The pneumatic zones can be connected to a manifold or valve assembly for selectively exposing each pneumatic zone to the high pressure air from the pump or to atmospheric (ambient) pressure for venting the respective pneumatic zone and collapsing the inflatable camper.

Alternatively, each of the side walls 114, 116 and end walls 118, 120 can be separate pneumatic zones, wherein the side and end walls are formed of the drop stitch material and thus provide self-supporting rigidity and structural integrity to maintain the respective vertical orientation in the inflated configuration. It is further contemplated the main cabin 130, the overhang cabin 140, the mattress 112, and the roof 122 can be formed of the drop stitch material, wherein the roof 122 and/or the mattress 112 can have a different thickness than the side walls 114, 116 and/or end walls 118, 120.

In one configuration, the present enclosure may further include an air pump 150, which can include a plurality of pumps, wherein the pump can be integral with the inflatable enclosure or removably connected. It is contemplated the pump 150 can be operably connected to a power source such as a battery, or selectively electrically connected to the pickup truck.

Figures 1, 2:
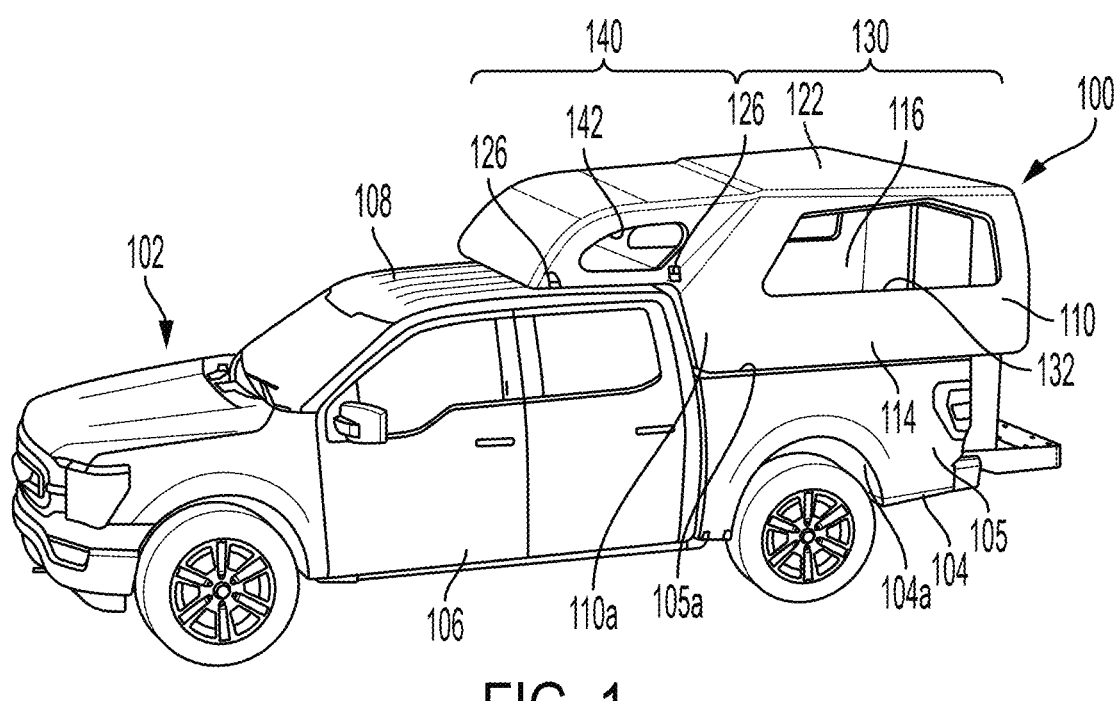
FIG. 1 is a front perspective view of a pickup truck with a configuration of the present inflatable camper.
FIG. 2 is a rear perspective view of the configuration of FIG. 1.
Figure 3:
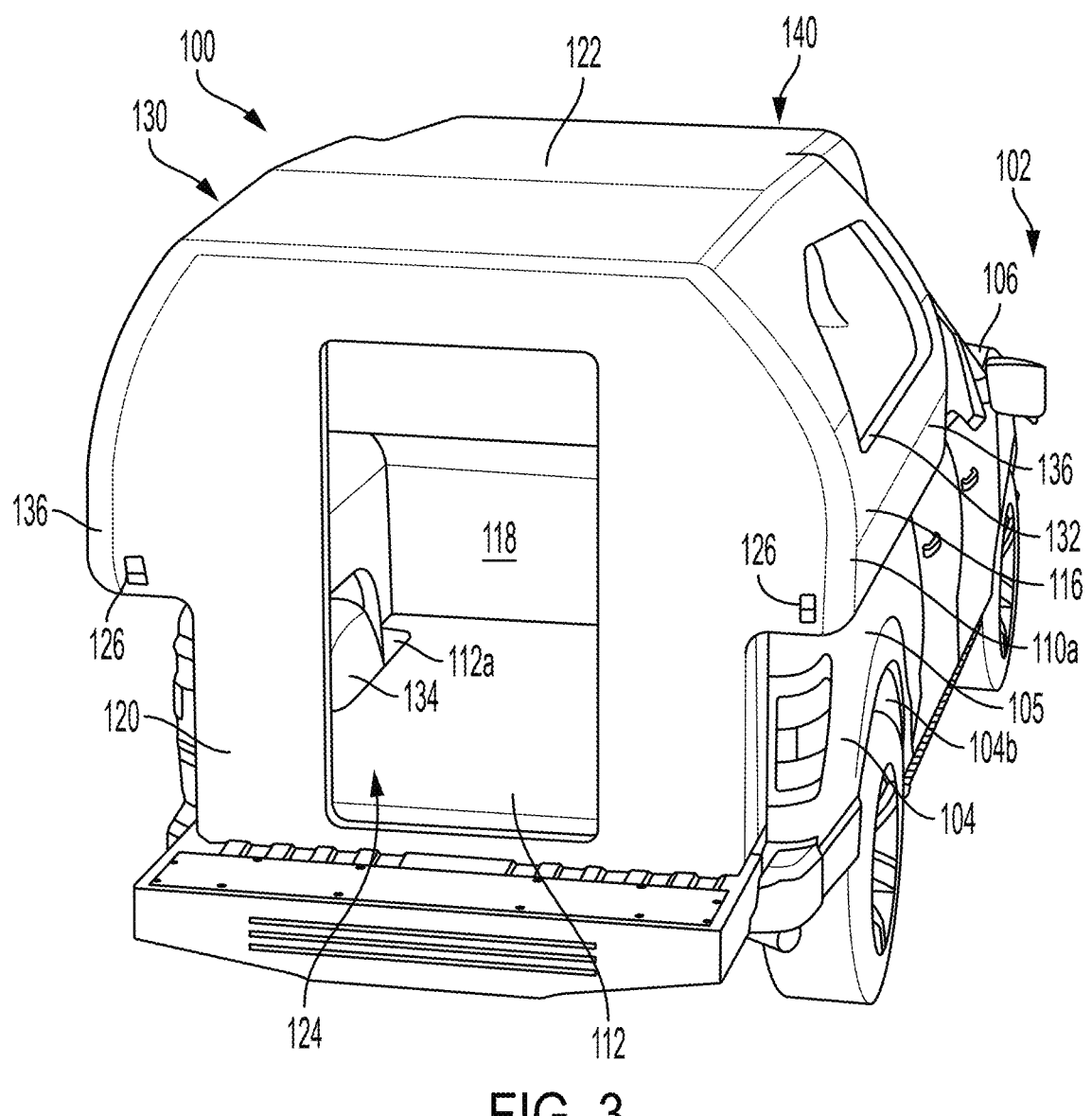
FIG. 3 is a further rear perspective view of the configuration of FIG. 1.
Figure 4:
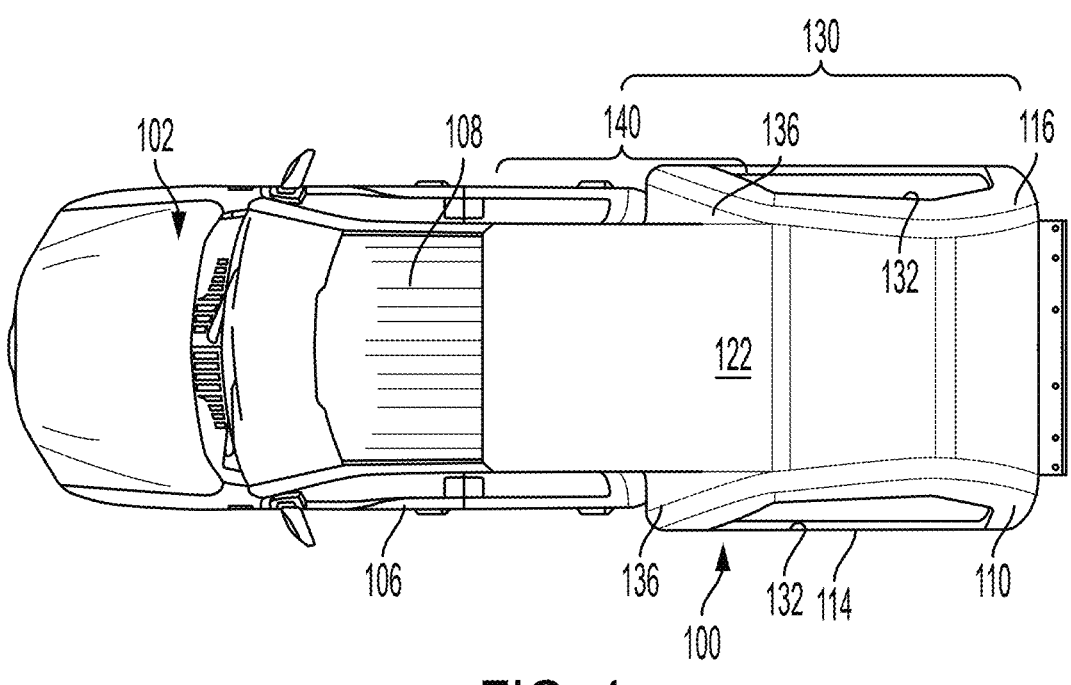
FIG. 4 is a top plan view of the configuration of FIG. 1.
Figure 5:
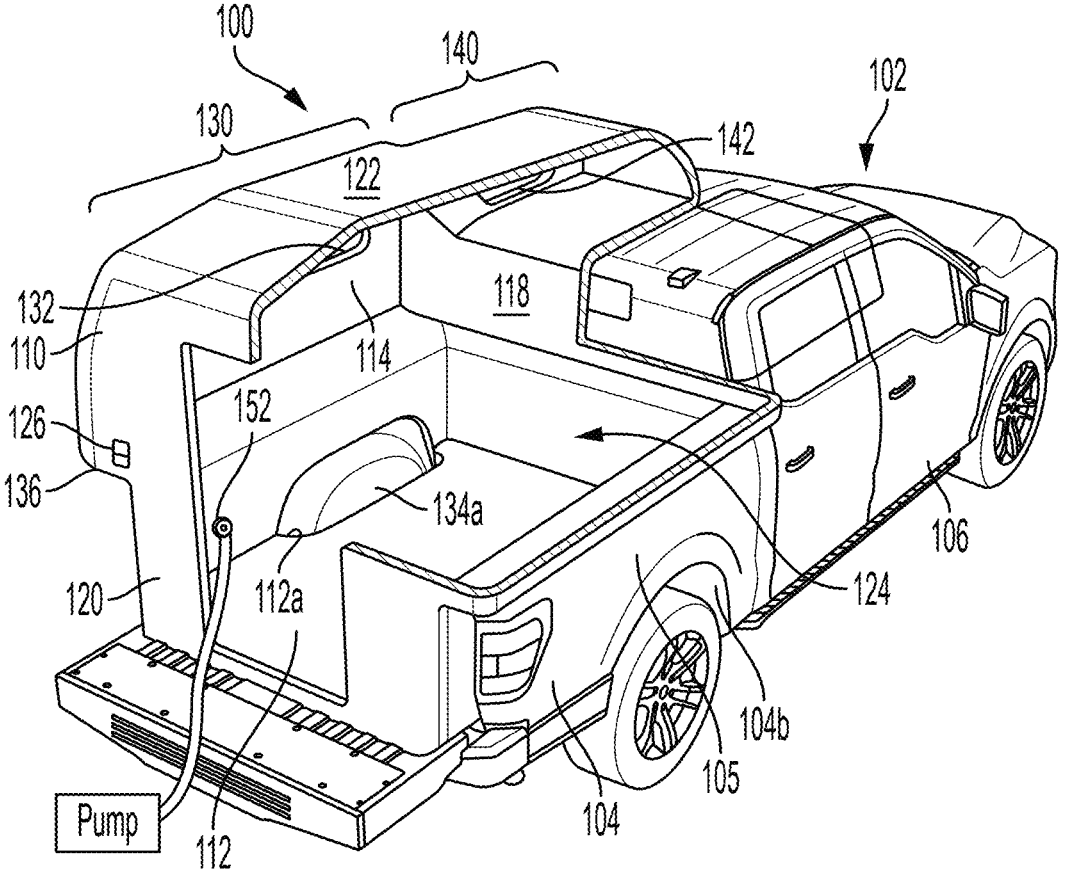
FIG. 5 is a top perspective view of the configuration of FIG. 1, with a portion of the inflatable camper removed showing the integrated air mattress.

One or more valves 152 may be operably located fluidly intermediate pump 150 and each of the first pneumatic zone and the second pneumatic zone, see e.g., FIGS. 2 and 5.

Valve 152a may be configured to selectively expose the first pneumatic zone to pump 150 while valve 152b may be configured to selectively expose the second pneumatic zone to pump 150. The first pneumatic zone, the second pneumatic zone (and/or the first pillar and the second pillar) are movable between a collapsed configuration and an inflated configuration in response to the high pressure gas from the pump 150.

The inflatable camper 110, and particularly the main cabin 130 can also include side eaves 136, that allow internal storage, as well as provide a ventilation bay. In addition, the side eaves 136 are sized to provide sufficient lateral overhang of the sides 105 of the truck bed 104 to at least substantially eliminate rainwater runoff into the bed 104. That is, the side eaves 136 are configured to overlie a top 105a of the bed walls 105 of the bed 104 of the pickup truck 102. As seen in FIGS. 1-5, the side eaves 136 can be configured to provide internal horizontal storage space in the main cabin 130.

In a further configuration, the main cabin 130 and the overhang cabin 140 include side walls 114, 116 and end walls 118, 120 made of the drop stitch material, wherein the side walls 114, 116 and end walls 118, 120 are movable between a collapsed, generally parallel, orientation and an installed configuration, wherein a plane of each inflated drop stitch material side wall 114, 116 intersects an inflated drop stitch material end wall 118, 120.

As shown in FIGS. 6-12, at least a portion of an alternative embodiment of an inflatable structure 210, such as the inflatable floor 212, the inflatable side walls 214, 216, the inflatable end wall(s) 218, 220, and the inflatable roof 222 can be formed of a high-pressure drop stitch material capable of maintaining 15 psi, and up to 20 psi, and in some configurations 30 psi. Similarly, an inflatable door 224 can be formed of drop stitch material.

Similar to inflatable camper 110 described above, inflatable structure 210 includes a plurality of independently inflatable pneumatic zones, e.g. floor 212, side walls 214, 216, end walls 218, 220, and/or roof 222. It is understood the inflatable structure can include any number of independently inflatable pneumatic zones, wherein at least two of the pneumatic zones are formed of the drop stitch material. The inflated drop stitch sections provide a vertically oriented, generally rigid self-standing structural member for defining the open volume 225 of inflatable structure 210. Inflatable structure 210 may remain in an erected configuration even after one of the plurality of independently inflatable pneumatic zones 212, 214, 216, 218, 220, 222 is deflated (such via a puncture). Thus, any persons located within the open volume 225 of inflatable structure 210 may safely exit the structure and avoid being trapped within the deflated structure.

Figures 11, 12:
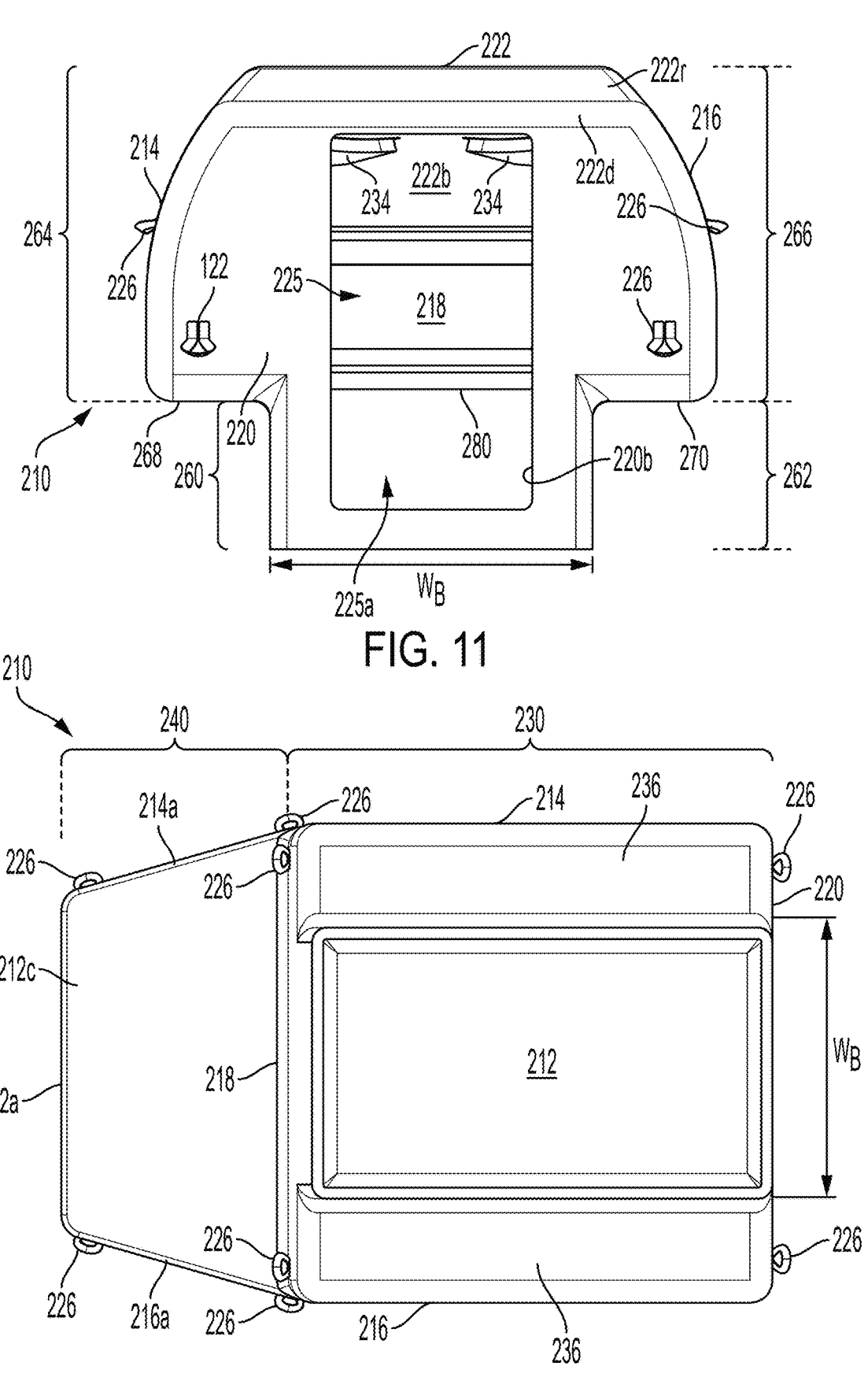
FIG. 11 is a rear plan view of the exemplary embodiment of FIG. 6, with the inflatable door removed.
FIG. 12 is a bottom plan view of the exemplary embodiment of FIG. 6.

In one configuration, floor 212 is a separate inflatable pneumatic zone from the side walls 214, 216 and/or end walls 218, 220 but is integrally connected to at least one of walls 214, 216, 218, 220, such as by one or more of fabric seams, PVC material webbing, tape, or an adhesive configured to provide pivoting and/or rotation between the floor 212 and the respective wall(s) 214, 216, 218, 220. Floor 212 can have a variety of configurations, wherein in one configuration the floor has a thickness between 5 cm and 20 cm, with an operable thickness of approximately 15 cm. The wall sections 214, 216, 218, 220 can be configured to have a nominal wall thickness, such as between 3 cm and 13 cm, with an operable thickness of approximately 5 cm. With reference to FIGS. 11 and 12, floor 212 may also define a floor width W B dimensioned such that floor 212 sits between wheel wells 104a, 104b of bed 104 of a pickup truck 102, see e.g., FIGS. 2 and 3.

An outside surface 210a of inflatable structure 210 can include a plurality of anchor loops 226, wherein the anchor loops 226 are attached to structure 210 to preclude non-destructive separations. Anchor loops 226 can be configured to engage a tie down or securing system 300a, 300b (see e.g., FIGS. 25-27) for retaining the inflatable structure relative to an underlying support structure, such as a pickup truck, a pull-behind trailer, a pontoon boat, the ground, or within a tree. The tie down system 300a, 300b can include a plurality of ratchet strap assemblies 302a, 302b, wherein the ratchet strap assemblies 302a, 302b include an elongate strap 304a, 304b having a high tensile strength and a ratchet assembly 306a, 306b connected to one end of the strap 304a, 304b.

Returning to FIGS. 6-12, inflatable structure 210 may include a main portion, (or main cabin) 230, which in one exemplary embodiment, may substantially have the foot-print of a bed 104 between wheel wells 104a, 104b of a pickup truck 102 (e.g., see FIG. 1). In addition, the inflatable structure 210 can include an overhang portion (or overhang cabin) 240 that may be configured to be generally supported by and have all or a portion of the footprint of the cab roof 108. It is contemplated that both the main cabin 230 and the overhang cabin 240 can be formed as a monolithic structure from drop stitch material.

As seen in FIGS. 6-12, the overhang cabin 240 may be formed as a continuation of side walls 214, 216 and roof 222 of the main cabin 230 and may include a cabin portion floor 212c. Roof 222 may continue forward from main cabin 230 to a forward edge 222a along an arcuate path to form an aerodynamic forward nose portion 222b. Forward nose portion 222b may be integral with roof 222, with both sharing a common pneumatic zone, or forward nose portion 222b may be a separate and distinct pneumatic zone apart from the remainder of roof 222, with roof 222 being comprised of one or more further independent pneumatic zones.

Figure 10:
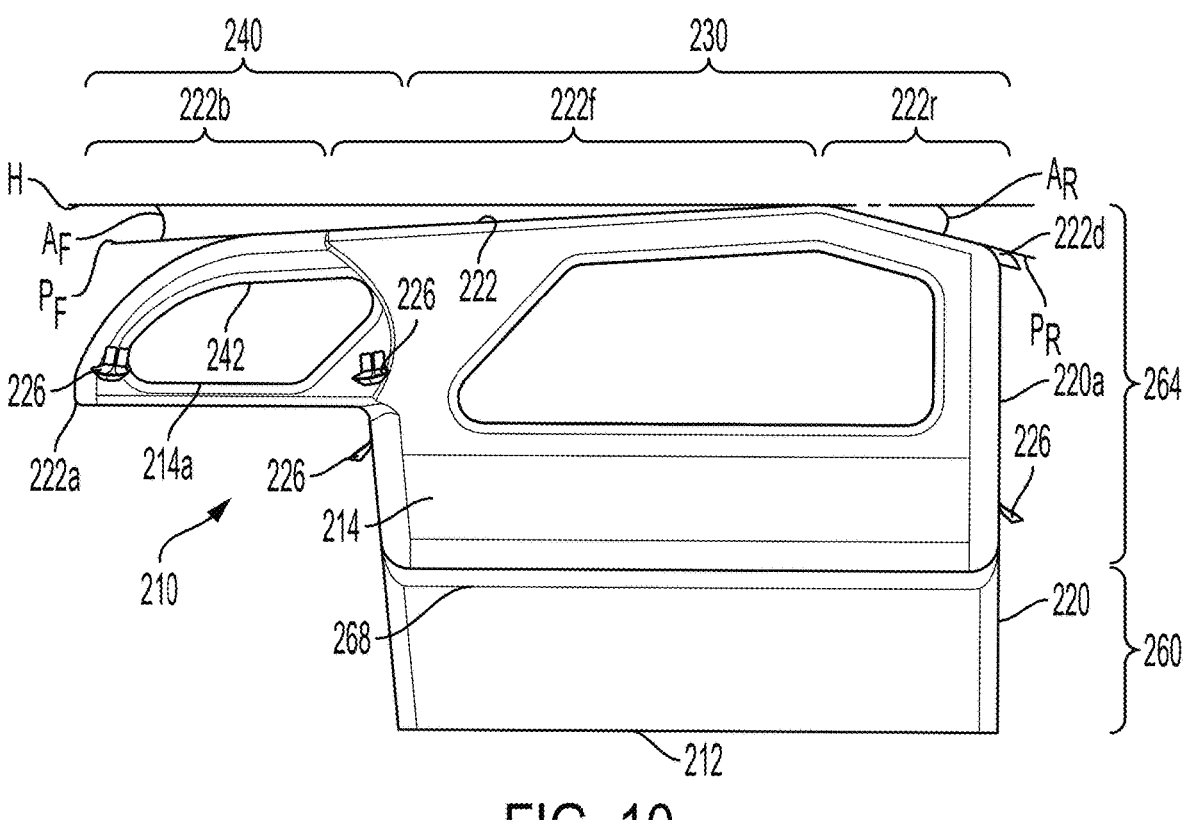
FIG. 10 is a side plan view of the exemplary embodiment of FIG. 6.

With particular reference to FIG. 10, roof 222 may have a first portion 222f extending rearwardly from the arcuate forward nose portion 222b with the first portion 222f of the roof 222 disposed along a first plane $P_F$ having a first angle $A_F$ relative to the horizontal plane H. A second portion 222r of the roof 222 may extend rearwardly from the first portion 222f to end wall 220. The second portion 222r may be disposed along a second plane $P_R$ having a second angle $A_R$ relative to the horizontal plane H. The length of first portion 222f may be shorter than, the same as, or longer than the length of second portion 222r, and angle $A_F$ may be smaller than, the same as, or larger than angle $A_R$. The second portion 222r may also include a trailing drip edge 222d extending rearwardly outward from the outer face 220a of end wall 220.

Side walls 214, 216 may be extended to include respective cabin side wall portions 214a, 216a. Each side wall portion 214a, 214b may be integral with its respective side wall 214, 216 so as to share a common pneumatic zone, or each side wall portion 214a, 214b may be a separate and distinct pneumatic zone apart from its respective side wall 214, 216. Overhang cabin 240 may also optionally include at least one overhang cabin side window 242. As seen in the FIGS. 6-12, there can be an overhang cabin side window 242 on each side of the overhang cabin 240. In one configuration, the overhang cabin side window 242 is a clear or at least partly transparent member that is fixedly (and water resistantly) connected to the surrounding portion of the inflatable struc-ture 210.

Each of the side walls 214, 216, end walls 218, 220, and roof 222 may be separate pneumatic zones, wherein side walls 214, 216 and end walls 218, 220 are formed of the drop stitch material and thus provide self-supporting rigidity and structural integrity to maintain the respective vertical orien-tation in the inflated configuration even should one pneu-matic zone become deflated. It is further contemplated the main cabin 230, the overhang cabin 240, the floor 212, and the roof 222 can be formed of the drop stitch material, wherein the roof 222 and/or the floor 212 can have a different thickness than the side walls 214, 216 and/or end walls 218, 220.

The inflatable structure 210, and particularly side walls 214, 216 of the main cabin 230 can be constructed to also include side eaves 236. As shown in FIGS. 6, 7, 9 and 11, side wall 214 and sidewall 216 may each be constructed to include a respective lower side portion 260, 262 and a respective upper eave side portion 264, 266. A generally horizontal step portion 268, 270 extends between the respec-tive lower and upper side portions 260, 264 and 262, 266. Sidewall 214 portions 260, 264, 268 may be constructed of drop stitch material as a single pneumatical zone, although it is envisioned that each portion 260, 264, 268 may each be defined as an individually isolated pneumatic zone. Step portions 268, 270 provide internal horizontal storage space in the main cabin 230. When inflated, step portions 268, 270 may be able to support more than 1,000 pounds without fatiguing the structure. As such, step portions 268, 270 may also provide a bench or seating surface accommodating up to 4 to 5 adults.

Figures 19, 20:
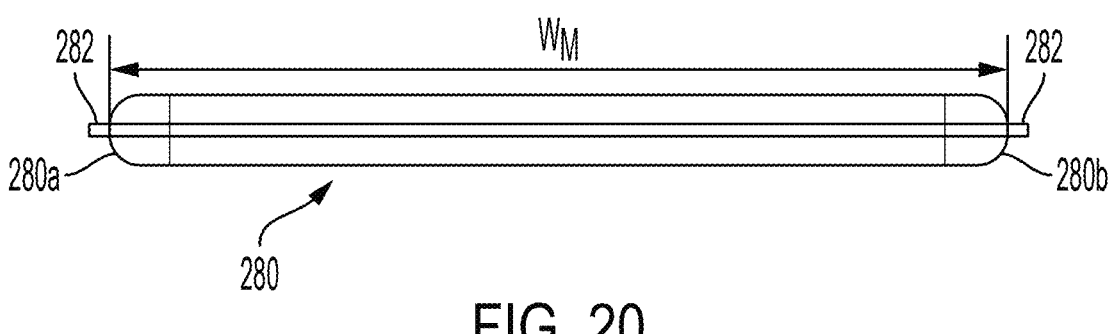
FIG. 19 is a top plan view of an exemplary embodiment of an inflatable mattress configured for use with the inflatable tent or camper of FIG. 6.
FIG. 20 is a side plan view of the inflatable mattress shutter of FIG. 19.

In another configuration, inflatable structure 210 may include a selectively removable mattress 280, wherein in one configuration the removable mattress 280 is comprised of inflatable drop stitch material having a thickness between 5 cm and 20 cm, with an operable thickness of approxi-mately 15 cm. With additional reference to FIGS. 19 and 20, removable mattress 280 may be dimensioned to have a width $W_M$ which is substantially the same as the width $W_C$ of main cabin 230 immediately above step portions 268, 270. Step portions 268, 270 may thus support removable mattress 280 a parallel spaced distance above floor 212 and may thus define a lower storage area 225a defined by removable mattress 280, floor 212, lower side wall portions 260, 264, and end wall 218. Removable mattress 280 may be of such rigidity so as to support the weight of two sleeping adults without sagging, deformation, or fatiguing of the drop stitch material comprising the mattress.

As shown in FIG. 8, mattress 280 may have a length $L_M$ substantially the same as the open interior length $L_C$ main cabin 230, although it should be noted that length $L_M$ may be shorter than $L_C$ if desired so as to enable easy access to lower storage area 225a when mattress 280 is installed. Mattress 280 may also include a plurality of fasteners 282 spaced along each side edge 280a, 280b of mattress 280. Fasteners 280 are configured to releasably engage corre-sponding fasteners 282a on the inner surface 214b, 216b of respective side walls 214, 216. Any suitable releasable fasteners 282, 282a may be used, including but not limited to buttons, snaps, clip-and-hoop, hook-and-loop, and the like. In one configuration, fasteners 280 are hoops structur-ally secured to mattress side edges 280a, 280b, whereby after removal of mattress 280 from within main cabin 230, mattress 280 may be used outside of structure 210, such as but not limited to an on-the-ground mattress or a floating dock for use in a lake or pond wherein weights may be secured to hoops 280 to anchor the mattress/dock 280.

In addition, when structure 210 is mounted onto a pickup truck 102, the side eaves 236 are sized to provide sufficient lateral overhang of the sides 105 of the truck bed 104 to at least substantially eliminate rainwater runoff into the bed 104. That is, the side eaves 236 are configured to overlie a top 105*a* of the bed walls 105 of the bed 104 of the pickup truck 102.

Figures 13, 14:
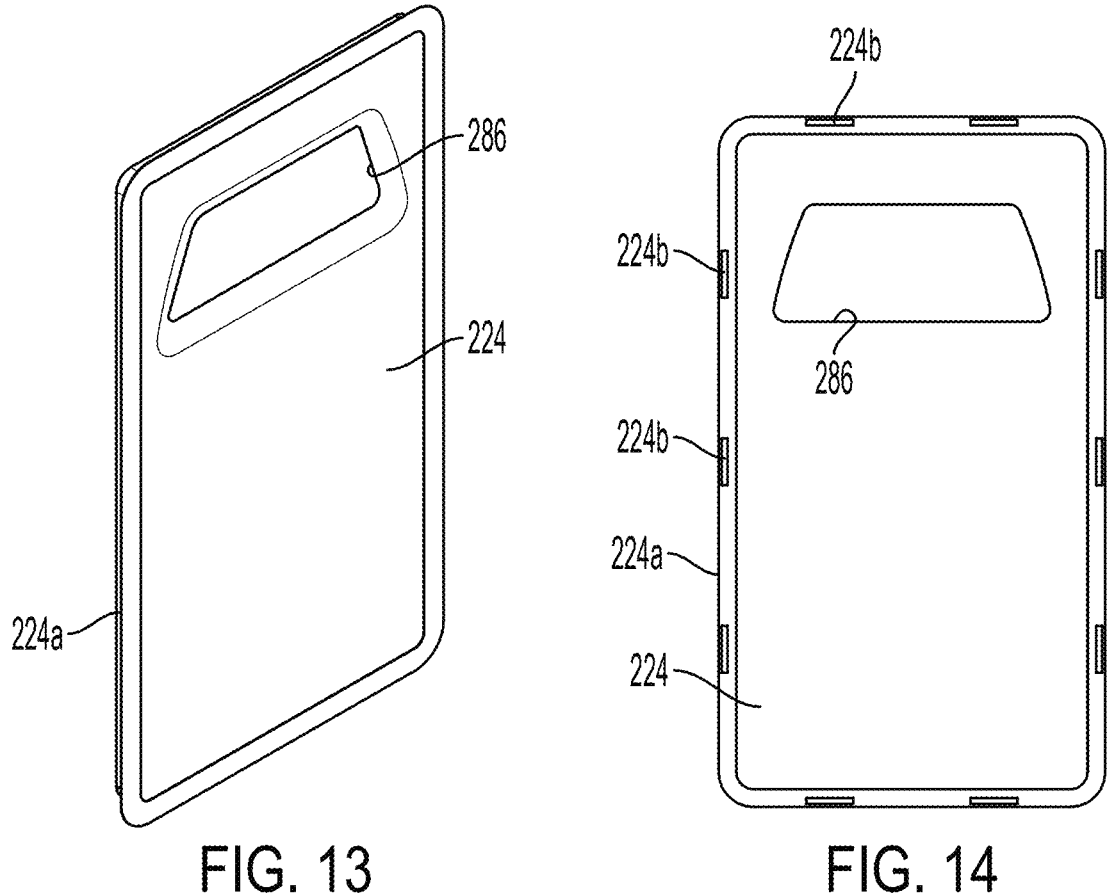
FIG. 13 is a front perspective view of an exemplary embodiment of an inflatable door configured for use with the inflatable tent or camper of FIG. 6.
FIG. 14 is a rear plan view of the inflatable door of FIG. 13.
Figure 15:
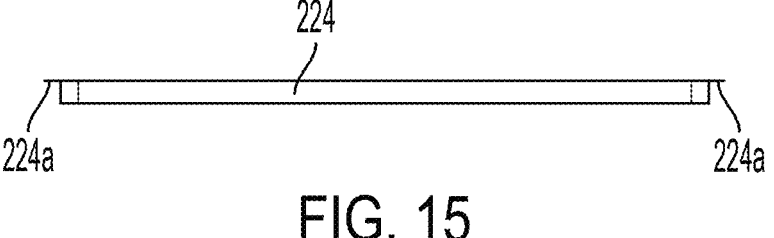
FIG. 15 is a side plan view of the inflatable door of FIG. 13.

As shown in FIGS. 6-8, door 224 is inflatable and hingedly attached to the main cabin 230 so as to be moveable between an open position and a closed position. With additional reference to FIGS. 13-15, door 224 may be a separably independent pneumatic zone or may be fluidly coupled with end wall 220. In one configuration, door 224 may include a permanently affixed clear pane 286. Door 224 may also include a door flap portion 224*a* extending outwardly around the perimeter of door 224, wherein door flap portion 224*a* is configured to seal the door opening 220*b* in end wall 220 when door 224 is in the closed orientation. Door flap portion 224*a* may further include a plurality of closing fasteners 224*b*, such as but not limited to hook-and-loop material or an adhesive, configured to secure door flap portion 224*a* to outer surface 220*a* of end wall 220. Although it is contemplated the door can also include an insect screen and window shutter as in the side windows, it is advantageous to sealingly affix the pane to the door, thereby reducing water penetration risk to the interior. The inflatable door includes a door handle connected to a latch to selectively retain the door in the closed position. It is further contemplated that the door can include a privacy latch (or lock) to inhibit opening of the door. In one configuration, the door is formed of the drop stitch material.

Figure 16:
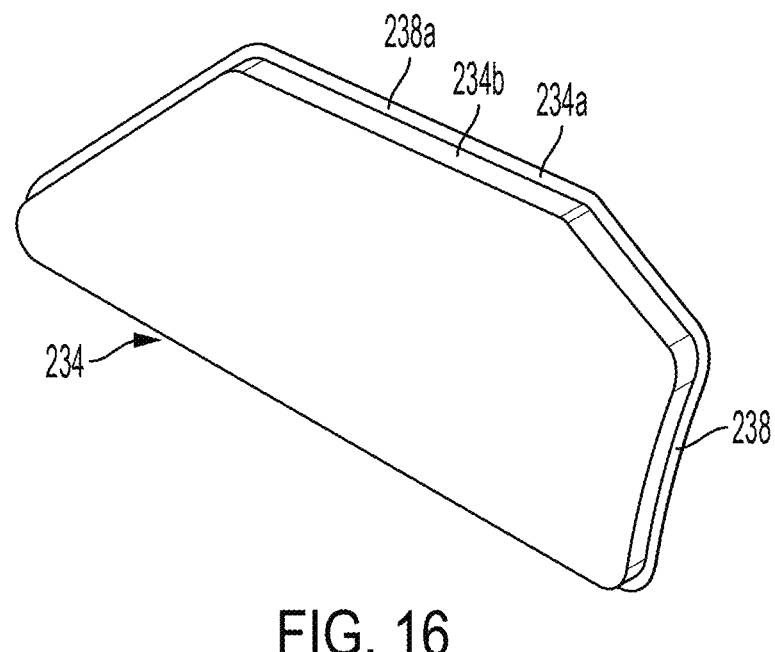
FIG. 16 is a rear perspective view of an exemplary embodiment of an inflatable window shutter configured for use with the inflatable tent or camper of FIG. 6.
Figures 17, 18:
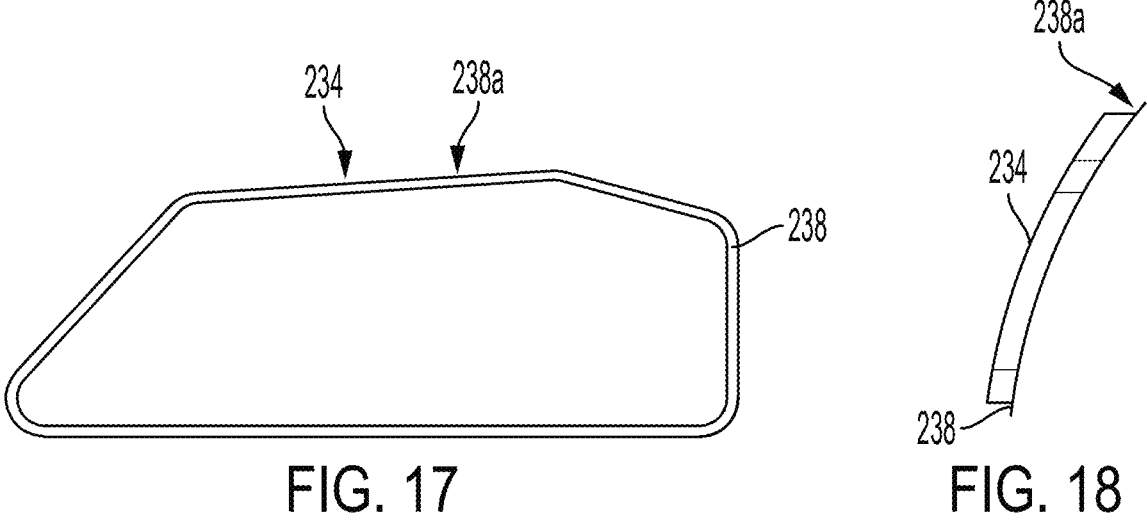
FIG. 17 is a rear plan view of the inflatable window shutter of FIG. 16.
FIG. 18 is a side plan view of the inflatable window shutter of FIG. 16.

The main cabin (or main portion) 230 of the inflatable structure 210 may include one or more main cabin side windows 232, wherein each main cabin side window 232 can include an insect screen as an outer layer and a window shutter 234 as an inner layer. With reference to FIG. 8, window shutter 234 is connected to the main cabin 230 by a hinge 234*a*, wherein the hinge 234*a* can be located along an upper edge 234*b* of the window shutter 234 so that the window shutter 234 can be pivoted/rotated from a closed position (not shown) occluding the side window 232 to a retracted or storage position as shown in FIGS. 8 and 11. With additional reference to FIGS. 16-18 window shutter 234 may include an overlapping flap portion 238 extending outwardly around the perimeter of shutter 234 that is configured to preclude the passage of water and releasably engages the adjacent portion of the main cabin 230 to preclude water migration into open volume/structure interior 225 from outside the main cabin 230. In one configuration, the top flap portion 238*a* may operate as hinge 234*a*. The window shutter can also be formed of drop stitch material and may define its own independent pneumatic zone.

In one configuration, the present enclosure may further include an air pump 250, which can include a plurality of pumps, wherein the pump can be integral with the inflatable enclosure or removably connected. It is contemplated the pump 250 can be operably connected to a power source such as a battery, or selectively electrically connected to a vehicle or power outlet.

One or more valves 252 may be operably located fluidly intermediate pump 250 and each of the first pneumatic zone and the second pneumatic zone, see e.g., FIG. 8. Valve 252*a* may be configured to selectively expose the first pneumatic zone to pump 250 while valve 252*b* may be configured to selectively expose the second pneumatic zone to pump 250.

The first pneumatic zone, the second pneumatic zone (and/or the first pillar and the second pillar) are movable between a collapsed configuration and an inflated configuration in response to the high pressure gas from the pump 250.

In a further configuration, the main cabin 230 and the overhang cabin 240 include side walls 214, 216 and end walls 218, 220 made of the drop stitch material, wherein the side walls 214, 216 and end walls 218, 220 are movable between a collapsed, generally parallel, orientation and an installed configuration, wherein a plane of each inflated drop stitch material side wall 214, 216 intersects an inflated drop stitch material end wall 218, 220.

In another configuration, inflatable structure 210 may also include a removable protective rug 290, substantially having the footprint of the floor 212 of the inflatable structure 210. In an exemplary embodiment, protective rug 290 may consists of two or more laminate layers, although it is envisioned that a single layer rug may be used. With reference to FIG. 24, protective rug may comprise a two layer material having a bottom layer 292 and an upper layer 294. Bottom layer 292 may be a non-slip material, such as a natural or synthetic rubber, so as to secure the protective rug 290 on floor 212 and prevent or minimize slipping or bunching of the rug during use. Upper layer 294 may be a natural or synthetic material, and in one embodiment may be manufactured from polyethylene terephthalate (PET) fibers. The PET layer is configured to be cut a puncture resistant.

In the exemplary embodiment, the bottom rubber player 292 may have a thickness of about 1.5 mm while the upper PET layer 294 has a thickness of about 4.8 mm, with rug 290 have an overall thickness of about 6.3 mm. With reference to FIGS. 21-23, rug 290 may fabricated as a flat sheet including a plurality of defined bends or folds 296 whereby rug 290 may be configured to fold into an open-topped tray 298 having a bottom 298*a* and a side wall 298*b*. Bottom 298*a* may substantially have the footprint of floor 212 while side wall 298*b* may substantially have the dimensions of lower side wall portions 260, 262 of the inflatable structure 210, see FIG. 23.

Although the present description is set forth in terms of the inflatable camper connected to the bed of the pickup truck, it is contemplated that the inflatable camper can be operably connected to a variety of applications having a bed or even a ground area or tree area, such as tenting, hunting, fishing, boating, and camping.

It is also contemplated that the inflatable camper, such as the main cabin, includes a fluid drain port for selectively passing liquid from the interior of the camper to the exterior. The fluid drain port is selectively movable between an open position permitting the passage of fluid and a closed position precluding the passage of fluid.

This disclosure has been described in detail with particular reference to an embodiment, but it will be understood that variations and modifications can be affected within the spirit and scope of the disclosure. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed:

1. An inflatable tent comprising:
   a) a first side wall having a top edge, a bottom edge, a first side edge, and a second side edge;
   b) a second side wall having a top edge, a bottom edge, a first side edge, and a second side edge;

c) a first end wall having a top edge, a bottom edge, a first side edge, and a second side edge, the first side edge of the first end wall coupled to the first side edge of the first side wall, and the second side edge of the first end wall coupled to the first side edge of the second side wall;

d) a roof coupled to the respective top edges of the first side wall, the second side wall, and the first end wall; and d) a floor coupled to the respective bottom edges of the first side wall, second side wall and first end wall, wherein the inflatable tent is formed of a drop stitch material and includes a plurality of pneumatically isolated pneumatic zones independently movable between a collapsed configuration and an inflated configuration, wherein each of the first side wall, the second side wall, the first end wall, the roof, and the floor is fluidly connected to a respective independently isolated pneumatic zone of the plurality of pneumatically isolated pneumatic zones.

2. The inflatable tent of claim 1, wherein at least one of the first side wall and the second side wall, in the inflated configuration, defines a first eave portion projecting outwardly from an adjacent lower side wall portion of the respective side wall.

3. The inflatable tent of claim 2, wherein the other of the first side wall and the second side wall, in the inflated configuration, defines a second eave portion projecting outwardly from an adjacent lower side wall portion of the other respective side wall.

4. The inflatable tent of claim 3, wherein a first step portion extends between the adjacent lower side wall portion of the at least one of the first side wall and the second side wall and the first eave portion, and wherein a second step portion extends between the adjacent lower side wall portion of the other of the at least one of the first side wall and the second side wall and the second eave portion, wherein the first step portion and the second step portion lie on a horizontal plane parallel to the floor.

5. The inflatable tent of claim 4, wherein each of the first eave portion and the second eave portion define an arcuate lateral cross section.

6. The inflatable tent of claim 4, further comprising a removable mattress portioned to rest on each of the first step portion and the second step portion a spaced distance above the floor.

7. The inflatable tent of claim 4, wherein the removable mattress includes a first side edge configured to be releasably secured to first eave portion and a second side edge configured to be releasably secured to the second eave portion.

8. The inflatable tent of claim 2, wherein the first eave portion includes a window having an insect screen occluding the window.

9. The inflatable tent of claim 8, further comprising an inflatable shutter configured to be removably coupled to the window to secure the window in a closed position, the inflatable shutter formed of a drop stitch material.

10. The inflatable tent of claim 1, further comprising:

a valving assembly having a plurality of valves, wherein each respective valve of the plurality of valves is fluidly connected to a corresponding respective independently isolated pneumatic zone of the plurality of pneumatically isolated pneumatic zones, and a manifold, wherein the manifold has an inlet, a plurality of outlets, the inlet being connected to a pump, and each respective outlet of the plurality of outlets being connected to a corresponding respective valve of the plurality of valves.

11. The inflatable tent of claim 1, wherein the floor is about 4 feet wide and configured to fit between standard wheel wells within a bed of a pickup truck.

12. The inflatable tent of claim 11, wherein the inflatable tent is configured to remain road-worthy in the inflated configuration within the bed of the pickup truck while the pickup truck is being operated at highway speeds.

13. The inflatable tent of claim 1, wherein the inflatable tent is configured to remain in the inflated configuration after deflation of any one of the first side wall, the second side wall, the first end wall, the roof, and the floor.

14. The inflatable tent of claim 1, further comprising a second end wall having a first side edge and a second side edge, the first side edge of the second end wall coupled to the second side edge of the first side wall and the second side edge of the second end wall coupled to the second side edge of the second side wall, wherein the second end wall defines an opening therethrough for ingress into and egress from an open interior defined by the inflatable tent in the inflated configuration, and wherein the inflatable tent further comprises an inflatable door pivotally connected to the second end wall to selectively open and close the opening, wherein the inflatable door is formed of a drop stitch material.

15. The inflatable tent of claim 1, wherein the first side wall, the second side wall and the first end wall include a plurality of fasteners configured to secure the inflatable tent to a surface.

16. The inflatable tent of claim 15, wherein the surface is a pickup truck bed, the ground or within a tree.

17. The inflatable tent of claim 1, wherein the inflatable tent includes an overhang cabin configured to overlie a portion of a cab of a pickup truck, and wherein the overhang cabin is constructed of drop stitch material.

18. The inflatable tent of claim 17, wherein the overhang cabin includes an arcuate forward nose portion coterminous with the roof.

19. The inflatable tent of claim 18, wherein the roof has a first portion extending rearwardly from the arcuate forward nose portion, wherein the first portion of the roof lies in a first plane having a first angle relative to the horizontal plane, and a second portion extending rearwardly from the first portion of the roof to the second side edge of the first side wall and the second side edge of the second side wall, wherein the second portion of the roof lies in a second plane having a second angle relative to the horizontal plane.

20. The inflatable tent of claim 18, wherein the second portion of the roof includes a trailing drip edge extending rearwardly outward of the plane defined by the second side edge of the first side wall and the second side edge of the second side wall.

21. The inflatable tent of claim 1, further comprising a protective tray having a tray bottom commensurate with the floor and tray side walls configured to extend upwardly along at least a portion of the first end wall and the lower side wall portions of the first and second side walls.

22. An inflatable tent assembly for a truck, the truck having a cab and a bed, the bed at least partly defined by the cab and a pair of opposing bed sidewalls, the opposing bed sidewalls having an interior surface and an exterior surface, the inflatable tent assembly comprising:

(a) an inflatable tent movable between a collapsed configuration and an inflated configuration, the tent in the inflated configuration having a first upright side wall, a second upright side wall, a roof, and a mattress, the inflatable tent the inflatable tent formed of a drop stitch material and having a plurality of pneumatically isolated pneumatic zones, at least one of the pneumatic zones in the inflated configuration defining an eave over hanging at least a portion of the exterior surface of the bed sidewall;

(b) a pump configured to generate a pressurized gas; and (c) a manifold connected to the pump and each of the plurality of zones, the manifold configured selectively expose each of the zones to the pressurized gas.

23. The inflatable tent assembly of claim 22, wherein the eave includes a vent/passageway to an interior of the inflatable tent in the inflated configuration.

24. The inflatable tent assembly of claim 22, further comprising an inflatable door connected to one of the first side wall and the second side wall, wherein the inflatable door is formed of a drop stitch material.

25. The inflatable tent assembly of claim 22, wherein the eave extends laterally outward from the exterior surface of the truck sidewalls.

26. The inflatable tent assembly of claim 22, further comprising a valving assembly connected to the pump and configured to selectively connect one of the first pneumatic zone and the second pneumatic zone with the pump.

* * * * *